US008922567B2

(12) United States Patent
Guo et al.

(10) Patent No.: US 8,922,567 B2
(45) Date of Patent: Dec. 30, 2014

(54) REGULATION OF SCREEN COMPOSING IN A DEVICE

(75) Inventors: Jin Guo, Cupertino, CA (US); Yan Wang, San Jose, CA (US); Chandrasekaran Sakthivel, Sunnyvale, CA (US); Derek Foster, Sunnyvale, CA (US); Nunfang Hu, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 702 days.

(21) Appl. No.: 13/046,476

(22) Filed: Mar. 11, 2011

(65) Prior Publication Data

US 2012/0229480 A1 Sep. 13, 2012

(51) Int. Cl.

*G06T 1/00* (2006.01)
*G06T 15/00* (2011.01)
*G06F 15/00* (2006.01)
*G09G 5/36* (2006.01)

(52) U.S. Cl.

CPC ............ *G09G 5/363* (2013.01); *G09G 2360/08* (2013.01); *G09G 2340/0435* (2013.01)
USPC .......................................... 345/522; 345/501

(58) Field of Classification Search

CPC .................. G06F 15/00; G06F 15/16–15/161; G06T 1/00–1/0092; G06T 15/00–15/005
USPC .......................................... 345/501, 503, 522
See application file for complete search history.

(56) References Cited

U.S. PATENT DOCUMENTS

| | | | | |
|---|---|---|---|---|
| 7,222,253 | B2 * | 5/2007 | Samson et al. | 713/323 |
| 8,199,158 | B2 * | 6/2012 | Samson et al. | 345/519 |
| 8,345,053 | B2 * | 1/2013 | Jiao et al. | 345/505 |
| 2009/0027403 | A1 * | 1/2009 | Jung | 345/505 |

* cited by examiner

*Primary Examiner* — Jacinta M Crawford

(74) *Attorney, Agent, or Firm* — Sterne, Kessler, Goldstein & Fox P.L.L.C.

(57) ABSTRACT

At least a method and a system are described for regulating a screen composer of a device based on one or more conditions. In a representative embodiment, the method comprises measuring a processor's load level, activity level, or usage in the device. The method further comprises comparing the load level to a first value to determine if a first condition is satisfied. The method further comprises comparing a screen update rate of screen composition tasks of the device to a second value when the first condition is satisfied, wherein the second comparing is used to determine if a second condition is satisfied. The method further comprises regulating the screen composition tasks of the device when said first condition and the second condition are both satisfied. In a representative embodiment, the system comprises a device such as a wireless smartphone.

24 Claims, 3 Drawing Sheets

REGULATION OF SCREEN COMPOSING IN A DEVICE

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Modern computer systems generally employ a graphical user interface (GUI) provided by a display to interact with a user. The GUI may be used in computers, hand held devices, gaming devices, and other electronic devices, for example.

Graphical user interfaces (GUIs) are often implemented using many drawing layers. For example, each layer of the GUI may be rendered by one or more individual applications independently. A screen composing routine may be employed to compose the layers of the GUI. The screen composing routine can consume a significant amount of processing time for each screen update. When such routines occur at a high frequency, a device's processor may be subject to significant load which may affect overall system performance and GUI responsiveness.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a method and a system of regulating screen composition by way of measuring a processor's (or CPU's) load or usage level. The regulating may be further based on using a screen update rate of screen composition tasks. The device may comprise a smartphone that provides a screen or display for generating a graphical user interface to a user.

The various aspects and representative embodiments of the method and system are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention can be found in a method and a system of regulating the screen composition tasks in a device. In accordance with a non-limiting representative embodiment of the invention, the device may comprise a portable wireless device such as a smartphone, for example. Furthermore, for example, the device may comprise a computing device, a hand held device, a gaming device, and any electronic device that provides a graphical user interface. In accordance with the various aspects of the invention, the regulation of the screen composition tasks is performed by measuring the central processing unit (CPU) load, usage, or activity level of a processor within the device. For example, when the activity level or load of a processor (or CPU) reaches or exceeds a particular threshold level, a screen update that is currently being processed is completed and any other pending screen updates are released. The screen composer may be put to sleep for a specified period of time. After the screen composer wakes up, it may continue processing any of the screen updates that were previously released. A screen composing routine may consume a significant amount of CPU resources during a screen update. As a consequence of regulating the screen composer, the device's system performance is increased and the device's user interface responsiveness is improved because the processor or CPU of the device may be freed from its screen composition tasks which uses significant CPU resources and be better able to process other tasks unrelated to screen composition.

Figure 1:
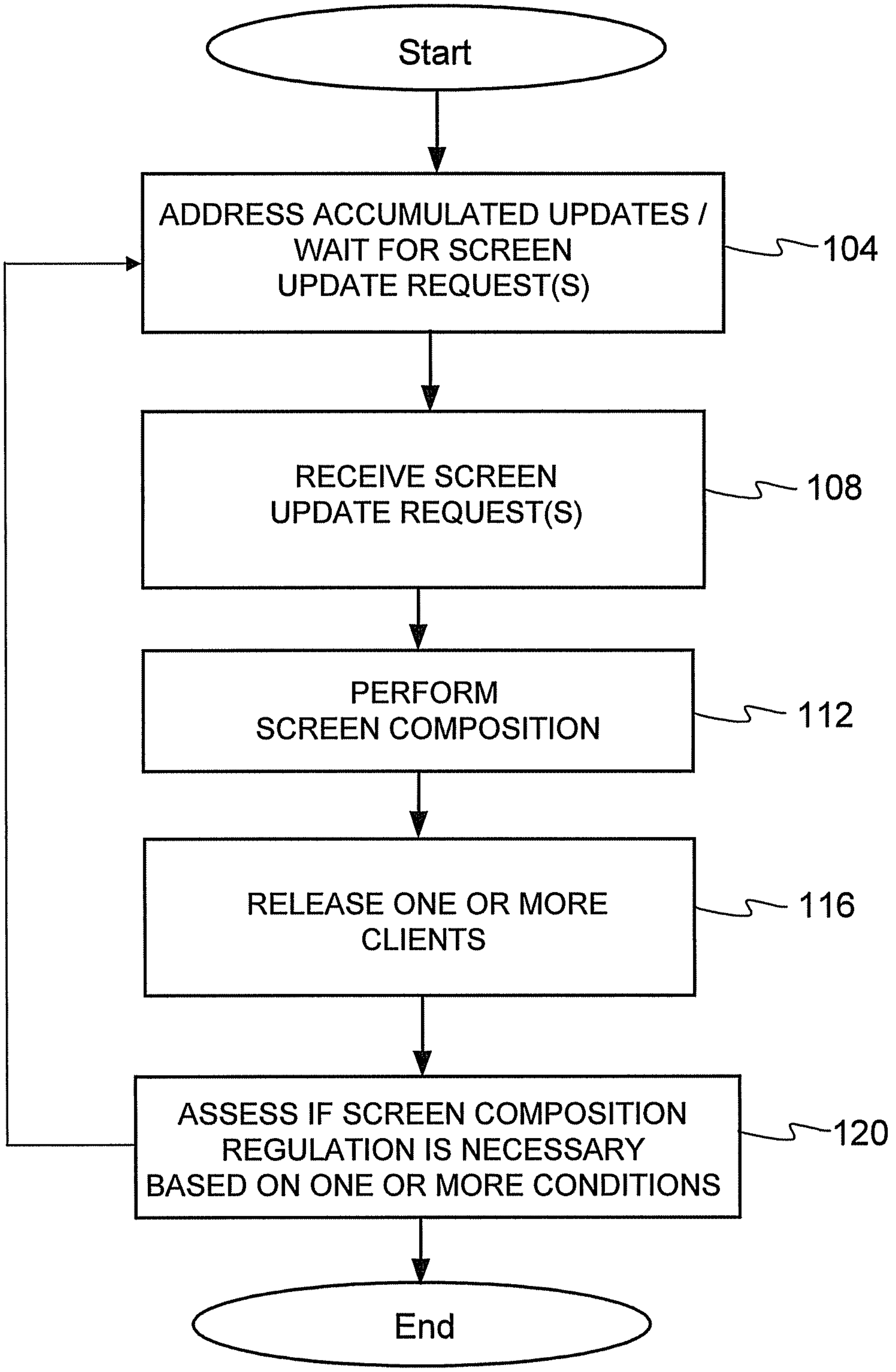
FIG. 1 is an operational flow diagram of a representative method by which a device performs regulation of screen composition tasks in accordance with an embodiment of the invention.

FIG. 1 is an operational flow diagram of a representative method by which a device performs regulation of screen composition tasks in accordance with an embodiment of the invention. At step 104, a processor or central processing unit (CPU) of the device waits for one or more screen update requests from one or more clients. Alternatively, and in addition to waiting for screen updates, the processor may address any accumulated updates which may have been postponed as a result of regulating the screen composer in one or more previous screen update cycles. The accumulated updates may be processed in a batch mode over a single screen update cycle. If there are no accumulated screen updates, the processor waits for new update requests from one or more clients. The one or more clients may comprise one or more applications that are used in the device. The one or more applications may comprise a web browser, such as Internet Explorer or Firefox, for example. Without limitation, the one or more applications may comprise any type of application that utilizes a graphical user interface (GUI) for displaying and interacting with a user. Next, at step 108, the screen composer may receive screen update requests for updating one or more layers of the device's screen. Each layer may correspond to a different color format, dimension, and orientation of the data to be displayed on the device's screen, for example. At step 112, the screen composer performs screen composition by writing data into a memory of the device, such as a frame buffer. After screen composition is performed for a layer and the device's frame buffer is updated, the client (or application) may be released at step 116 by way of control provided by the device's processor. Next, at step 120, the processor may regulate screen composition based on one or more conditions. The regulation occurs if the one or more conditions are met. The one or more conditions may be assessed during each screen update cycle, for example. The one or more conditions may be assessed periodically, for example. After regulation is performed as necessary based on the one or more conditions, the process reverts back to step 104, as shown in FIG. 1. In a representative embodiment, the regulation may comprise putting the screen composer to sleep. For example, any pending screen updates may be postponed until the screen composer wakes up. In an alternative representative embodiment, the regulation may comprise skipping any pending screen updates instead of postponing and accumulating the screen updates. For example, such skipping may comprise disregarding or ignoring the pending screen updates. Furthermore, the use of this skipping method may incorporate sending or reporting a fake message to any of the waiting clients (or applications) that the task was completed. The one or more conditions for regulating the screen composer may be based on one or more measurements of one or more parameters made by the processor. For example, the parameter that is measured may comprise a processor or CPU load. The CPU load may trigger the regulation when a particular threshold level is reached, for example. The trigger may occur when the CPU load reaches a particular level. Because screen composition may occur at a high rate or high frequency, the measurement sampling rate may occur at the same rate. For example, the one or more measurements may be made when processing a screen composition task associated with each screen layer update request. Each measurement cycle or period may coincide with a screen update composition cycle or the period in which a screen layer update is processed by the processor. A typical period of each update cycle may be a value between 16 milliseconds (ms) to 1000 ms, for example. When the screen composer is sleeping or inactive, any pending updates remaining at the time sleeping is initiated may be accumulated and processed when the screen composer wakes up (or is activated or restarted). Thus, the accumulation of screen updates for future processing in a batch fashion provides for a more efficient method of processing these pending screen updates. In a representative embodiment, the previously described method may be used in a wireless smartphone. As a non-limiting example, the smartphone may use a screen composer which operates in a Linux operating system such as an Android operating system. The process described in the operational flow diagram of FIG. 1 may end, for example, when the device's display or screen is powered down or when the device is turned off.

In a representative embodiment, the screen composer may be regulated based on using a predefined CPU load profile or load pattern. For example, regulation may occur if the CPU load matches a predefined CPU load profile or pattern. Furthermore, for example, the screen composer may be regulated based on using an average CPU load value measured over time. The average value may be determined using a specified number of samples. The period of time in which the samples are determined may be predetermined. For example, the screen composer may be placed in sleep mode or inactive mode when the CPU load exceeds or reaches the average CPU load value.

In another representative embodiment, the screen composer in a device may be regulated based on an operating context, wherein the context may be based on one or more parameters associated with its global operating system environment. For example, the screen composer may be placed in sleep mode when a specific application used or when a specific session of an application occurs.

In a further representative embodiment, the type of screen composition regulation performed on the screen composer comprises reducing the number of screen updates (measured in frames per second) presented to the screen composer. For example, the regulation may comprise reducing the screen update rate from 20 frames per second (fps) to 10 fps.

Figure 2:
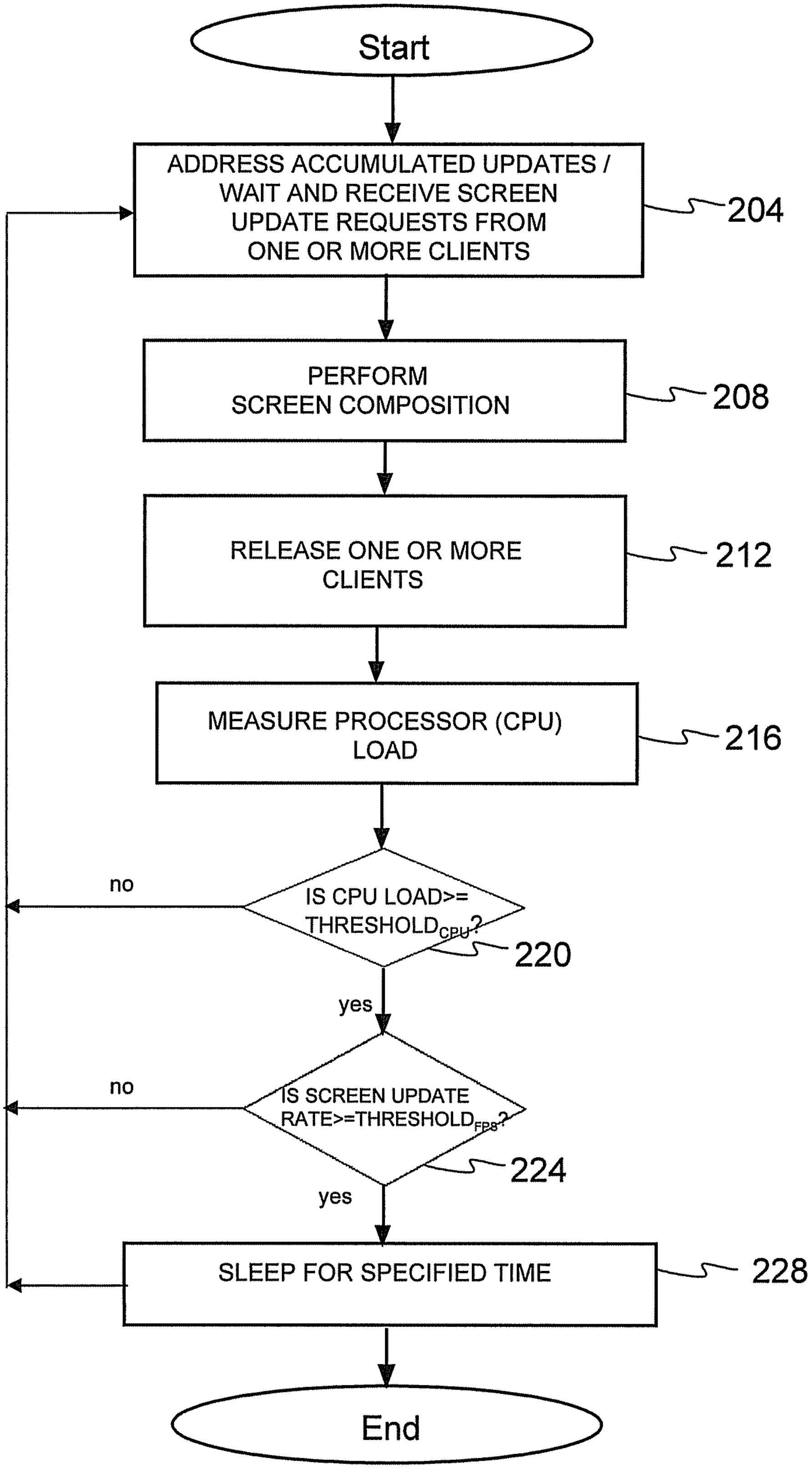
FIG. 2 is an operational flow diagram of a representative method by which a screen composer in a device is regulated in accordance with an embodiment of the invention.

FIG. 2 is an operational flow diagram of a representative method by which a screen composer in a device is regulated in accordance with an embodiment of the invention. The device may comprise a wireless smartphone, for example. The smartphone may utilize a Linux operating system such as the Android operating system. In this representative embodiment, regulation occurs by placing the screen composer into sleep mode in which the screen composer is inactivated for a period of time. At step 204, the screen composer addresses any previously pending updates that were put on hold when the screen composer was put to sleep. Otherwise, the screen composer waits for update requests from any of one or more clients used in the device. If there are any accumulated updates from a previously pending screen update, these accumulated updates may be processed before any new screen update requests are processed. The one or more clients may comprise one or more applications executed by the processor within the device. Next, at step 208, the screen is composed by way of processing the accumulated screen updates or by processing one or more newly presented screen updates. After an update is processed by the processor or CPU, the client(s) associated with the update(s) are released at step 212. Thereafter, at step 216, the CPU load (or CPU load level) may be measured. The CPU load may be measured during each screen layer update cycle. For example, the CPU load may be measured when a screen layer update is processed using the screen composer. The CPU load may be measured, for example, by way of computing the percentage of time the CPU is actively processing or is busy. The CPU load may be measured, for example, by way of computing a ratio of the time the CPU is in a busy state versus the time the CPU is in an idle state. In another non-limiting example, the CPU load value may be provided as a percentage of time the CPU is in its busy state. For example, the range of this CPU load value may vary between 0% to 100%. Next, at step 220, the measured CPU load is compared to a first threshold value, $\text{THRESHOLD}_{CPU}$. The CPU threshold value, $\text{THRESHOLD}_{CPU}$, may correspond to a predefined CPU load value stored in a memory of the device. If, for example, the measured CPU load is greater than (or greater than or equal to) $\text{THRESHOLD}_{CPU}$, the process continues with step 224. Otherwise, the CPU load is considered to be below the busy threshold criterion and the process reverts back to step 204 where additional screen update requests may be received and addressed. At step 224, the screen composition frame rate (or screen update rate) is compared to a second threshold value, $\text{THRESHOLD}_{FPS}$. This frame per second (FPS) threshold value, $\text{THRESHOLD}_{FPS}$, may correspond to a predefined threshold value stored in a memory of the device. If, for example, the frame rate or screen update rate is greater than (or greater than or equal to) $\text{THRESHOLD}_{FPS}$, the process continues with step 228. The screen update rate may correspond to the rate in which screen layer updates are received or processed by the screen composer. The one or more update requests may be received by one or more clients. If, for example, the frame rate or screen update rate is not greater than (or greater than or equal to) $\text{THRESHOLD}_{FPS}$ while the CPU load may be high, the frame rate is considered to be slow enough such that the process may revert back to step 204 where additional screen update requests may be received and addressed. In this scenario, the screen composer continues to operate even though the CPU load is high. At step 228, the screen composer of the device is put to sleep for a specified period of time if the two conditions described above at steps 220 and 224 are satisfied. The period of time may be predefined or may be adjusted by a user. In a non-limiting example, the period of time may be set to 20 milliseconds (20 ms). By way of placing the screen composer to sleep mode for a period of time, the processor or CPU may be relieved of its screen composition activities and be better able to address other processor (CPU) related tasks. The process described in the operational flow diagram of FIG. 2 may end, for example, when the device's display or screen is powered down or when the device is turned off. Furthermore, in an alternate embodiment, step 224 may be implemented as an optional step in the method described in FIG. 2. In this alternate embodiment, the process may proceed from step 220 to step 228 (bypassing step 224) if the CPU load is greater than (or greater than or equal to) $\text{THRESHOLD}_{CPU}$.

Figure 3:
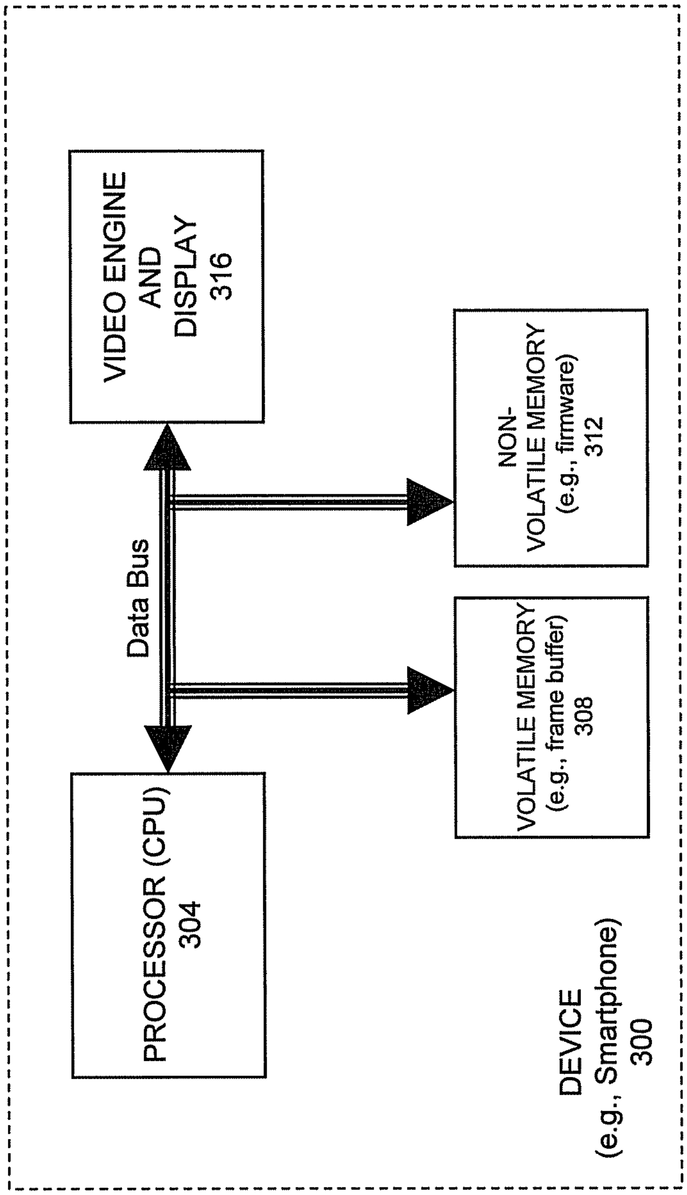
FIG. 3 is a block diagram of a device that regulates screen composition tasks in accordance with an embodiment of the invention.

FIG. 3 is a block diagram of a device that regulates screen composition tasks in accordance with an embodiment of the invention. In a representative embodiment, the device 300 comprises a portable wireless device such as a smartphone. The smartphone may comprise a cellular phone using an Android operating system, for example. The smartphone may comprise a video engine and display 316. The video engine and display 316 may be used to provide a graphical user interface (GUI) to a user. The video engine and display 316 may access the data stored in the volatile memory 308 to generate a graphical user interface to a user of the device 300. The device 300 may comprise a processor (CPU) 304 communicatively coupled to a volatile memory 308 and a non-volatile memory 312. As illustrated, a data bus is used to communicatively couple the processor 304 to the video engine and display 316 and to the memories 308, 312. As illustrated in FIG. 3, data may be transmitted between the processor 304, memories 308, 312 and the video engine and display 316 by way of the data bus. The non-volatile memory 312 may be used to store software and/or firmware for realizing the method described in connection with each of FIGS. 1 and 3. In accordance with the various aspects of the invention, the processor 304 may execute software and/or firmware stored in the non-volatile memory 312. The software and/or firmware may comprise instructions or code for performing the steps described in connection with FIGS. 1 and 2. When the stored instructions or code are executed by the processor 304, the method described in either FIGS. 1 and 2 may be performed. The software and/or firmware may comprise code or instructions for managing and regulating screen composition for the device. The non-volatile memory 312 may be further used to store one or more threshold values previously described, such as $\text{THRESHOLD}_{CPU}$ and/or $\text{THRESHOLD}_{FPS}$. The volatile memory 308 may be used as a frame buffer for storing one or more layers to be displayed by the video engine and display 316. The screen update requests may be processed by the processor 304 such that graphics data associated with a screen layer of a request may be stored in the frame buffer. After one or more requests have been processed by the processor 304, the data stored in the volatile memory 308 may be transmitted to the video engine and display 316 where it may be seen and used by a user of the device.

The various aspects of the present invention may be realized in the form of hardware, software/firmware, or a combination thereof. The hardware may comprise one or more circuits, operable for performing the steps of the methods described in connection with FIGS. 1 and 2, for example. Furthermore, the present invention may be realized using any kind of processor based system or other apparatus adapted for carrying out the methods described herein. A typical combination of hardware and software may comprise a general-purpose processor and a combination of firmware and/or software such that, when being loaded and executed, may control the system such that it executes the methods described herein. The device or system may comprise one or more processors and memory for storing the firmware and/or software. The present invention may also be embedded in a computer program product, which comprises all the features enabling the implementation of the methods described herein, and which when loaded into a computer system is able to execute these methods. Computer program in the present context means any expression, in any language, code or notation, of a set of instructions intended to cause a system having an information processing capability to perform particular functions either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method used in a device, comprising:

measuring a load level of a processor in the device;

comparing the load level to a first value to determine if a first condition is satisfied;

comparing a screen update rate of screen composition tasks of the device to a second value when the first condition is satisfied, to determine if a second condition is satisfied:

postponing the screen composition tasks of the device when the first condition and the second condition are satisfied by putting a screen composition routine in a sleep state;

accumulating the postponed screen composition tasks while the screen composition routine is in the sleep state; and processing the accumulated screen composition tasks in a batch mode over a single screen update cycle when the screen composition routine is no longer in the sleep state.

2. The method of claim 1, wherein postponing comprises putting the screen composition routine in the sleep state for a specified period of time when the first condition and the second condition are satisfied.

3. The method of claim 1, further comprising:

determining the load level by computing a percentage of time the processor is busy.

4. The method of claim 1, wherein the load level is determined by using busy and idle times of the processor.

5. The method of claim 1, wherein the screen update rate corresponds to a rate in which each screen layer is processed by a screen composer of the device.

6. The method of claim 1, wherein the device comprises a portable wireless device.

7. The method of claim 1, wherein the first condition comprises whether the load level is greater than or equal to the first value.

8. The method of claim 1, wherein the second condition comprises whether the screen update rate is greater than or equal to the second value.

9. A device, comprising:

a circuit configured to:

measure a load level of a processor in the device;

compare the load level to a first value to determine if a first condition is satisfied;

compare a screen update rate of screen composition tasks of the device to a second value when the first condition is satisfied to determine if a second condition is satisfied;

postpone the screen composition tasks of the device when the first condition and the second condition are satisfied, by putting a screen composition routine in a sleep state;

accumulate the postponed screen composition tasks while the screen composition routine is in the sleep state; and process the accumulated screen composition tasks in a batch mode over a single screen update cycle when the screen composition routine is no longer in the sleep state.

10. The device of claim 9, wherein the circuit is configured to put the screen composition routine in the sleep state for a specified period of time when the first condition and the second condition are satisfied.

11. The device of claim 9, wherein the circuit is further configured to determine the load level by computing a percentage of time the processor is busy.

12. The device of claim 9, wherein the load level is determined by using busy and idle times of the processor.

13. The device of claim 9, wherein the screen update rate corresponds to a rate in which each screen layer is processed by a screen composer of the device.

14. The device of claim 9, wherein the device comprises a portable wireless device.

15. The device of claim 9, wherein the first condition comprises whether the load level is greater than or equal to the first value.

16. The device of claim 9, wherein the second condition comprises whether the screen update rate is greater than or equal to the second value.

17. A system, comprising:

a processor; and a memory for storing firmware, wherein executing the firmware by the processor causes the system to:

measure a load level of the processor in the system;

compare the load level to a first value to determine if a first condition is satisfied;

compare a screen update rate of screen composition tasks of the system to a second value when the first condition is satisfied, to determine if a second condition is satisfied;

postpone the screen composition tasks of the system when the first condition and the second condition are satisfied, by putting a screen composition routine in a sleep state;

accumulate the postponed screen composition tasks while the screen composition routine is in the sleep state; and process the accumulated screen composition tasks in a batch mode over a single screen update cycle when the screen composition routine is no longer in the sleep state.

18. The system of claim 17, wherein the sleep state lasts for a specified period of time when the first condition and the second condition are satisfied.

19. The system of claim 17, wherein executing the firmware by the processor further causes the system to determine the load level by computing a percentage of time the processor is busy.

20. The system of claim 17, wherein executing the firmware by the processor further causes the system to determine the load level by using busy and idle times of the processor.

21. The system of claim 17, wherein the screen update rate corresponds to a rate in which each screen layer is processed by a screen composer of the system.

22. The system of claim 17, further comprising a portable wireless device.

23. The system of claim 17, wherein the first condition comprises whether the load level is greater than or equal to the first value.

24. The system of claim 17, wherein the second condition comprises whether the screen update rate is greater than or equal to the second value.

* * * * *